US011543018B2

(12) United States Patent
Kisaichi et al.

(10) Patent No.: US 11,543,018 B2
(45) Date of Patent: Jan. 3, 2023

(54) TRANSMISSION UNIT (71) Applicant: HONDA MOTOR CO., LTD., Tokyo (JP)

(72) Inventors: Toru Kisaichi, Tokyo (JP); Masaya Morita, Tokyo (JP); Takashi Okamoto, Tokyo (JP); Mitsutaka Matsuzawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/704,744

(22) Filed: Mar. 25, 2022

(65) Prior Publication Data

US 2022/0307585 A1 Sep. 29, 2022

(30) Foreign Application Priority Data

Mar. 29, 2021 (JP) .............................. JP2021-056080

(51) Int. Cl.
*F16H 57/04* (2010.01)
(52) U.S. Cl.
CPC ..... *F16H 57/0424* (2013.01); *F16H 57/0426* (2013.01)
(58) Field of Classification Search
CPC ............ F16H 57/0424; F16H 57/0426; F16H 2003/008; F16H 2003/0803; F16H 2003/089; F16H 2003/0933
USPC ........................................................ 475/308
See application file for complete search history.

(56) References Cited

U.S. PATENT DOCUMENTS

| 4,987,974 A | * | 1/1991 | Crouch | ................... F16N 21/00 464/7 |
| 6,604,608 B2 | * | 8/2003 | Fegg | ........................ F01M 1/02 184/6.12 |
| 2004/0060774 A1 | * | 4/2004 | Oshidari | ............. F16H 57/0479 184/6.12 |
| 2009/0165545 A1 | | 7/2009 | Fujimoto et al. | |

FOREIGN PATENT DOCUMENTS

| JP | 2009-174699 A | 8/2009 |
| JP | 2010-151276 A | 7/2010 |
| JP | WO 2015/146914 A1 | 10/2015 |
| JP | 2020-085021 A | 6/2020 |

OTHER PUBLICATIONS

May 11, 2022, Spanish Search Report issued for related ES Application No. P202230285.

* cited by examiner

*Primary Examiner* — Colby M Hansen
(74) *Attorney, Agent, or Firm* — Paratus Law Group, PLLC (57) ABSTRACT

An in-case oil passage extending in an axial direction above a plurality of gears is formed inside an outer peripheral wall portion of the accommodating case. The in-case oil passage includes an in-case oil passage opening portion which opens from the cover wall portion to the one end side in the axial direction. The cover wall portion is provided with an oil guide member at a position where at least a part of the cover wall portion overlaps the in-case oil passage opening portion when viewed from the one end side in the axial direction, the oil guide member guiding oil discharged from the in-case oil passage opening portion to the oil collecting portion of the oil collecting pocket.

4 Claims, 7 Drawing Sheets

TRANSMISSION UNIT

CROSS-REFERENCE TO RELATED APPLICATIONS

This application is based on and claims priority under 35 USC 119 from Japanese Patent Application No. 2021-056080 filed on Mar. 29, 2021.

TECHNICAL FIELD

The present disclosure relates to a transmission unit mounted on a motorcycle or the like.

BACKGROUND ART

In the related art, a transmission unit is mounted on a motorcycle or the like. In a transmission unit mounted on a motorcycle or the like, it is necessary to supply oil to a gear or the like in order to lubricate and cool the gear or the like. In this case, it is preferable that a larger amount of oil is supplied to the gear or the like.

Therefore, for example, JP-A-2020-085021 discloses a transmission unit in which an in-shaft oil passage extending in an axial direction and having an open right end portion is formed inside a counter shaft, and a cover wall pivotally supporting a right end portion of the counter shaft is provided with an oil collecting pocket protruding rightward from the cover wall at a position where at least a part of the oil collecting pocket overlaps the counter shaft. In the transmission unit of JP-A-2020-085021, oil scattered in a clutch chamber adjacent to the right side of a transmission chamber for accommodating the counter shalt and a plurality of gears can be collected in the oil collecting pocket, and the oil collected in the oil collecting pocket is supplied to the in-shaft oil passage.

However, in the transmission unit of JP-A-2020-085021, since the oil supplied to the in-shaft oil passage is only a part of the oil scattered in the clutch chamber, there is a limit to the amount of oil supplied to the in-shaft oil passage.

SUMMARY

The present disclosure provides a transmission unit capable of supplying a larger amount of oil to an in-shaft oil passage.

According to an aspect of the present disclosure, there is provided a transmission unit including:
a gear transmission including a transmission shaft and a plurality of gears; and
an accommodating case including a transmission chamber which rotatably and pivotally supports the transmission shaft and accommodates the gear transmission, in which:
the accommodating case includes:
an outer peripheral wall portion which covers outer peripheral surfaces of the plurality of gears; and
a cover wall portion which pivotally supports a first end portion on one end side of the transmission shaft in an axial direction and covers one end side of the gear transmission in the axial direction to form a side wall on one end side of the transmission chamber in the axial direction;
the first end portion of the transmission shaft is exposed from the cover wall portion to the one end side in the axial direction;
an in-shaft oil passage extending in the axial direction of the transmission shaft is formed inside the transmission shaft;
the in-shaft oil passage includes an in-shaft oil passage opening portion which opens from the first end portion of the transmission shaft to the one end side in the axial direction;
the cover wall portion is provided with an oil collecting pocket at a position where at least a part of the cover wall portion overlaps the transmission shaft when viewed from the one end side in the axial direction, the oil collecting pocket protruding from the cover wall portion to the one end side in the axial direction and including an oil collecting portion opened upward and on the other end side in the axial direction;
the oil collecting portion of the oil collecting pocket is configured to collect oil scattering in a space adjacent to the transmission chamber;
the oil collected in the oil collecting portion of the oil collecting pocket is supplied to the in-shaft oil passage from the in-shaft oil passage opening portion;
an in-case oil passage extending in the axial direction above the plurality of gears is formed inside the outer peripheral wall portion of the accommodating case;
the in-case oil passage includes an in-case oil passage opening portion which opens from the cover wall portion to the one end side in the axial direction, and the cover wall portion is provided with an oil guide member at a position where at least a part of the cover wall portion overlaps the in-case oil passage opening portion when viewed from the one end side in the axial direction, the oil guide member guiding oil discharged from the in-case oil passage opening portion to the oil collecting portion of the oil collecting pocket.

According to the present disclosure, an oil collecting portion of an oil collecting pocket collects oil discharged from an in-case oil passage opening portion in addition to oil scattered in a space adjacent to a transmission chamber, so that a larger amount of oil can be supplied to an in-shaft oil passage.

DESCRIPTION OF EMBODIMENTS

Hereinafter, as an example of a transmission unit of the present disclosure, an embodiment of a drive unit mounted on a motorcycle will be described with reference to the accompanying drawings. It should be noted that the drawings are viewed in directions of reference numerals. In the present specification, in order to simplify and clarify the description, each of front, rear, left, right, up and down directions is described in accordance with a direction viewed from a driver of a motorcycle, and in the drawings, a front side of a vehicle is represented by Fr, a rear side is represented by Rr, a left side is represented by L, right side is represented by R, an upper side is represented by U, and a lower side is represented by D.

Figure 1:
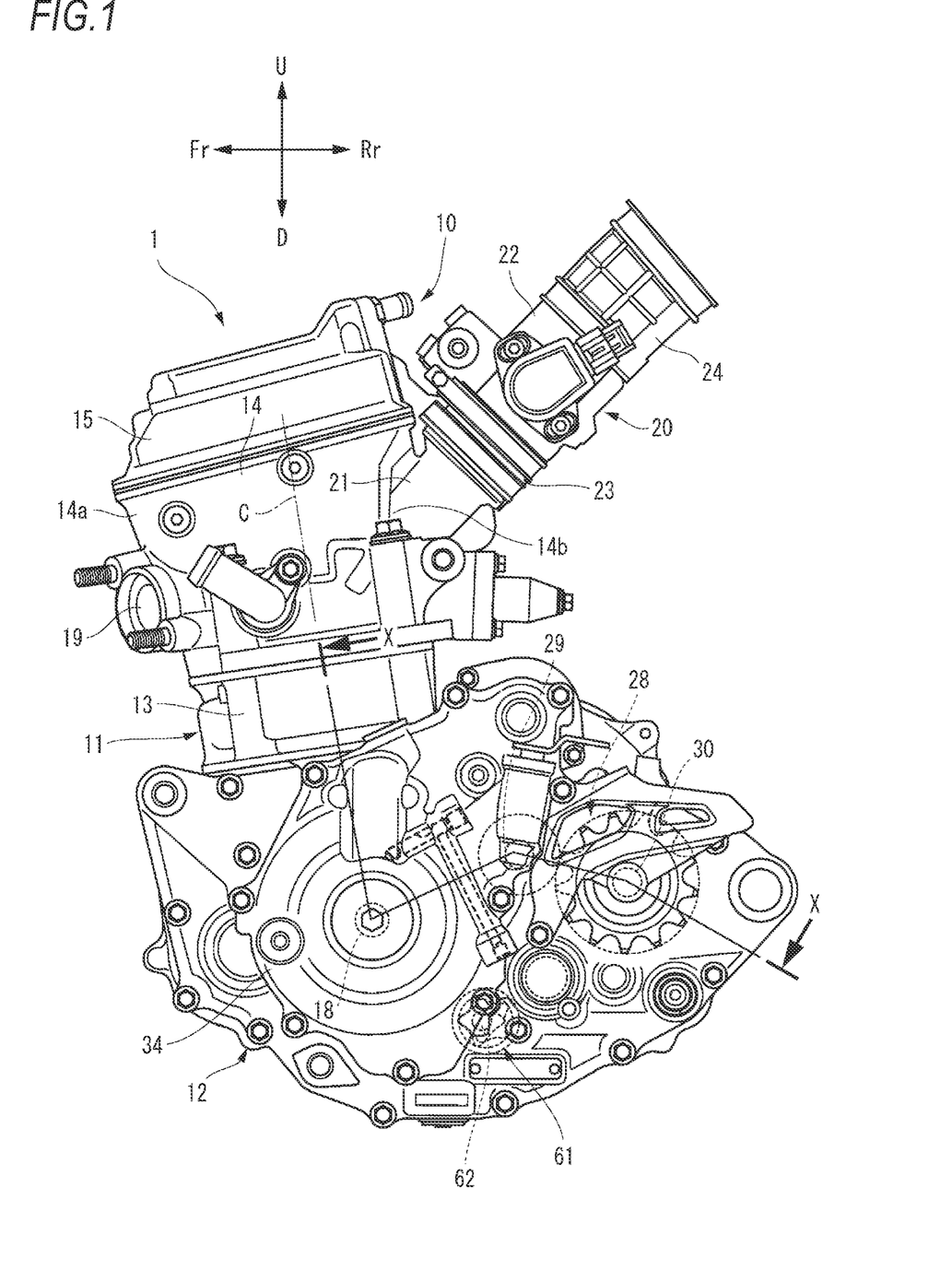
FIG. 1 is a left side view of a drive unit according to an embodiment of the present disclosure.
Figure 2:
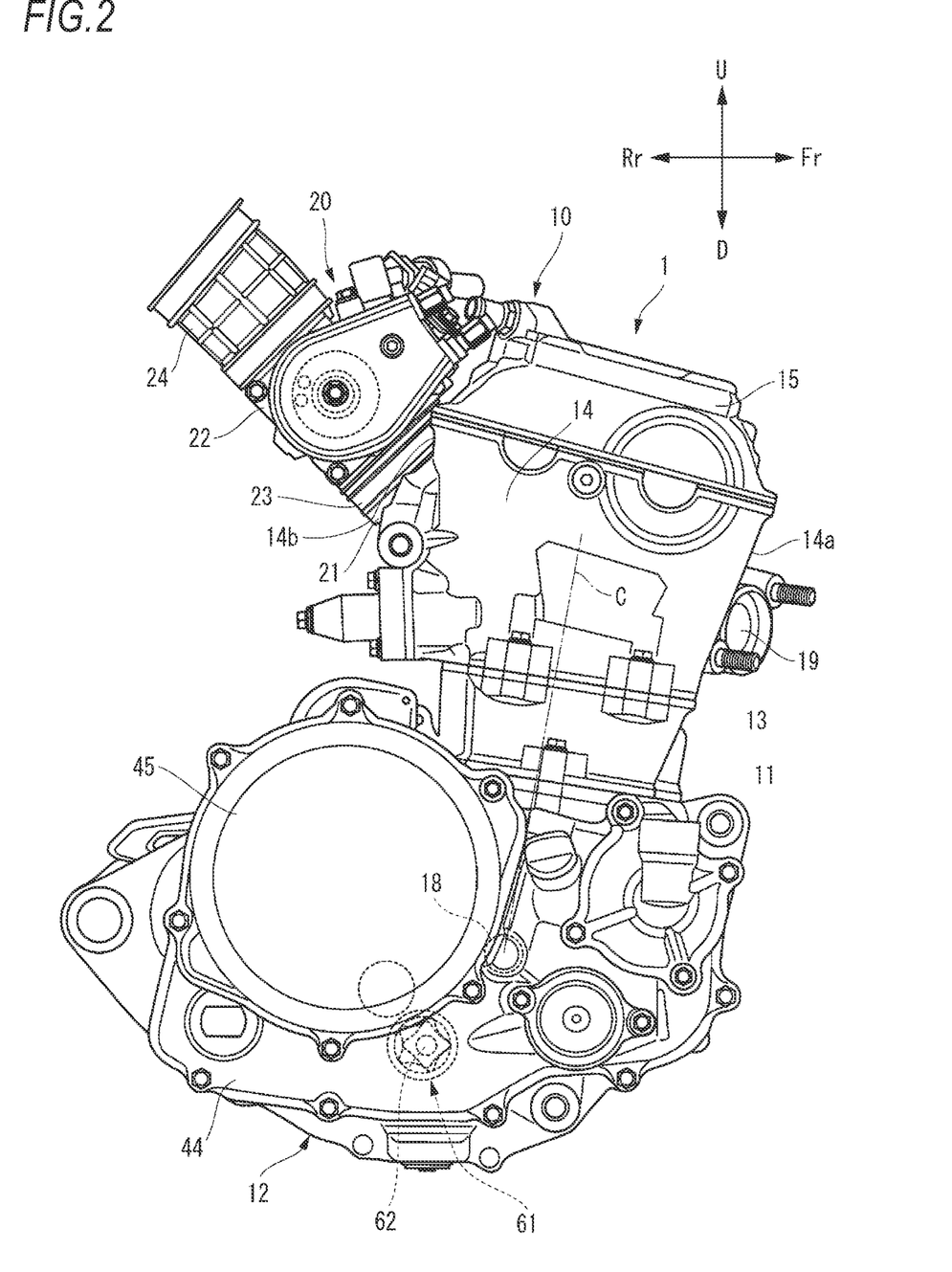
FIG. 2 is a right side view of the drive unit illustrated in FIG. 1.

As illustrated in FIGS. 1 and 2, a drive unit 1 mounted on a motorcycle includes a single-cylinder internal combustion engine 10. An engine body 11 of the internal combustion engine 10 includes a crankcase 12 which rotatably supports a crankshaft 18 extending in a vehicle width direction of the internal combustion engine 10, a cylinder body 13 which is coupled to a front upper portion of the crankcase 12 so as to rise upward from the crankcase 12, a cylinder head 14 which is coupled to an upper portion of the cylinder body 13, and a head cover 15 which is coupled to an upper portion of the cylinder head 14. The drive unit 1 is mounted on the motorcycle in a posture in which a cylinder axis C of the engine body 11 of the internal combustion engine 10 is slightly inclined forward.

The cylinder head 14 is provided with a pair of left and right exhaust ports 19 opened in a front wall 14a of the cylinder head 14. An upstream end portion of an exhaust system (not illustrated) of the internal combustion engine 10 is connected to the exhaust port 19. An intake connecting pipe portion 21 which forms a single intake port (not illustrated) is provided on a rear wall 14b of the cylinder head 14 in a manner of protruding rearward and obliquely upward. An intake system 20 of the internal combustion engine 10 includes a throttle body 22 which adjusts the amount of air supplied to the intake port, an insulator 23 which connects the intake connecting pipe portion 21 and the throttle body 22, a connecting tube 24 whose downstream end is connected to an upstream end of the throttle body 22, and an air cleaner (not illustrated) to which an upstream end of the connecting tube 24 is connected.

Figure 3:
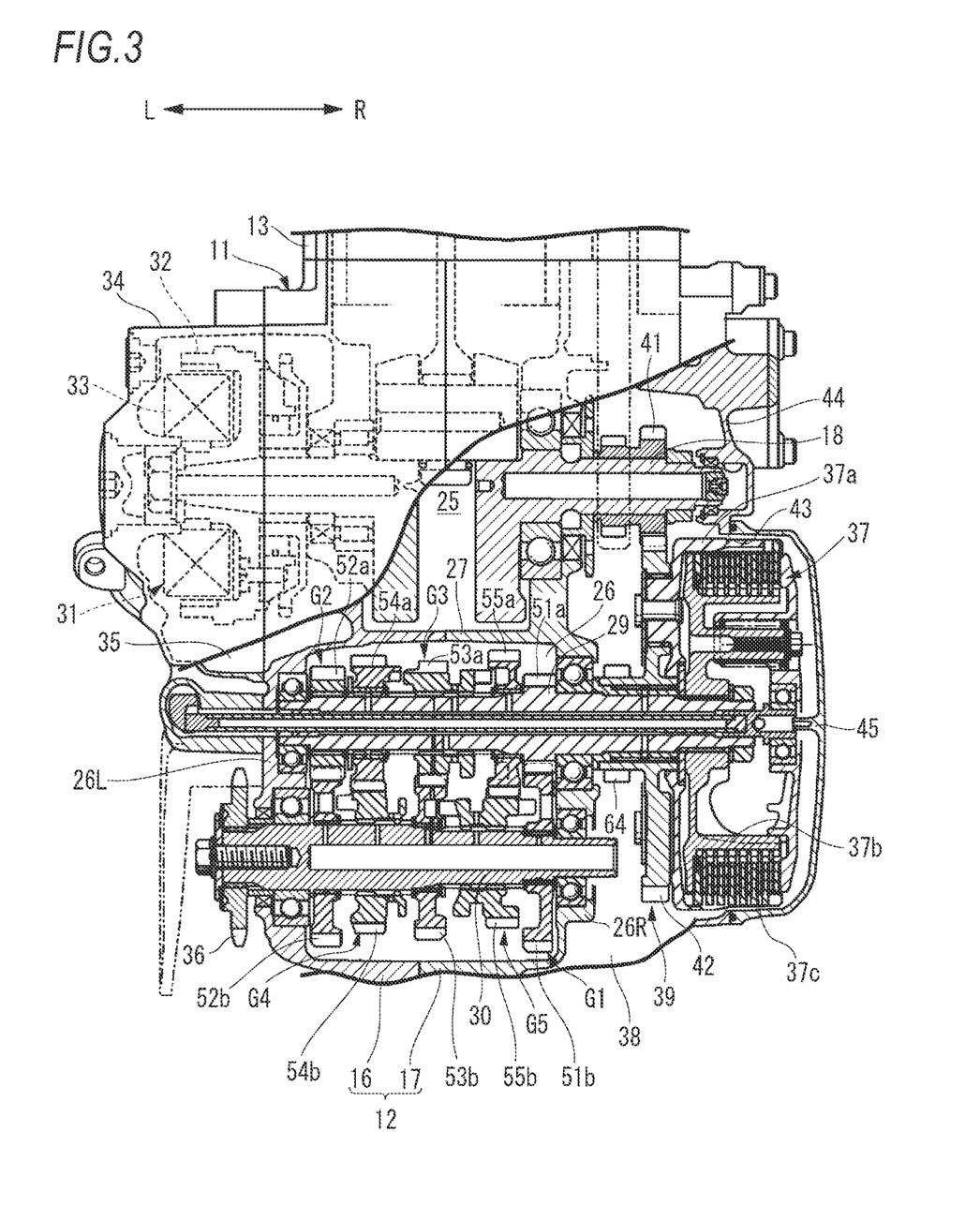
FIG. 3 is a cross-sectional view taken along a line X-X of FIG. 1.

As illustrated in FIG. 3, the crankcase 12 includes a pair of left and right crankcase half bodies 16 and 17 which can be divided in the vehicle width direction. The crankshaft 18 having an axis extending in the vehicle width direction is rotatably supported by the crankcase 12.

A crank chamber 25 and a transmission chamber 26 are formed in the crankcase 12. The crank chamber 25 and the transmission chamber 26 are formed adjacent to each other in the crankcase 12, and are separated by a partition wall 27. A main part of the crankshaft 18 is accommodated in the crank chamber 25. A gear transmission 28 is accommodated in the transmission chamber 26. As illustrated in FIG. 1, the gear transmission 28 is disposed behind the crankshaft 18 in the vehicle front-rear direction, and is accommodated in the transmission chamber 26.

The gear transmission 28 includes an input-side transmission shaft 29, an output-side transmission shaft 30, and a gear train having a plurality of gear stages which is provided between the input-side transmission shaft 29 and the output-side transmission shaft 30 and can be alternatively meshed with each other. In the present embodiment, the gear train having the plurality of gear stages includes the first to fifth speed gear trains G1, G2, G3, G4, and G5. The input-side transmission shaft 29 and the output-side transmission shaft 30 have axes which extend parallel to each other and parallel to the crankshaft 18 in the vehicle width direction.

The left crankcase half body 16 includes a left cover wall portion 26L which covers a left side of the gear transmission 28 and forms a left side wall of the transmission chamber 26. The right crankcase half body 17 includes a right cover wall portion 26R which covers a right side of the gear transmission 28 and forms a right side wall of the transmission chamber 26. The input-side transmission shaft 29 and the output-side transmission shaft 30 are rotatably and pivotally supported by the left cover wall portion 26l, of the left crankcase half body 16 and the right cover wall portion 26R of the right crankcase half body 17.

In the present embodiment, the first to fifth speed gear trains G1, G2, G3, G4, and G5 are provided in an order of the first speed gear train G1, the fifth speed gear train G5, the third speed gear train G3, the fourth speed gear train G4, and the second speed gear train G2 from the right.

The first speed gear train G1 includes a first speed drive gear 51a which is provided integrally with the input-side transmission shaft 29 at a position adjacent to an inner side of the right cover wall portion 26R, and a first speed driven gear 51b which is rotatably supported by the output-side transmission shaft 30 via a first collar 51c (see FIG. 5) and meshed with the first speed drive gear Ma.

The second speed gear train G2 includes a second speed drive gear 52a which is fixed to the input-side transmission shall 29 at a position adjacent to an inner side of the left cover wall portion 26L, and a second speed driven gear 52b which is rotatably supported by the output-side transmission shaft 30 via a second collar 52c (see FIG. 5) and meshed with the second speed drive gear 52a.

The third speed gear train G3 includes a third speed drive gear 53a which is slidable in an axial direction relative to the input-side transmission shaft 29 at a position between the first speed drive gear 51a and the second speed drive gear 52a and supported by the input-side transmission shaft 29 so as to synchronously rotate with the input-side transmission shaft 29, and a third speed driven gear 53b which is rotatably supported by the output-side transmission shall 30 via a third collar 53c (see FIG. 5) and meshed with the third speed drive gear 53a. A shift fork (not illustrated) is engaged with the third speed drive gear 53a, and the third-speed drive gear 53a slides in the axial direction relative to the input-side transmission shaft 29 in accordance with the movement of the shift fork.

The fourth speed gear train G4 includes a fourth speed drive gear 54a which is rotatably supported by the input-side transmission shaft 29 via a collar at a position between the second speed drive gear 52a and the third speed drive gear 53a, and a fourth speed driven gear 54b which is slidable in the axial direction relative to the output-side transmission shaft 30, and is supported by the output-side transmission shaft 30 and meshed with the fourth speed drive gear 54a so as to rotate synchronously with the output-side transmission shaft 30. When the third speed drive gear 53a slides leftward relative to the input-side transmission shaft 29, the third speed drive gear 53a engages with the fourth speed drive gear 54a. When fourth speed drive gear 54a is engaged with the third speed drive gear 53a, the fourth speed drive gear 54a rotates synchronously with the input-side transmission shaft 29 integrally with the third speed drive gear 53a. A shift fork (not illustrated) is engaged with the fourth speed driven gear 54b, and the fourth speed driven gear 54b slides in the axial direction relative to the output-side transmission shaft 30 in accordance with the movement of the shift fork. When the fourth-speed driven gear 54b slides leftward relative to the output-side transmission shaft 30, the fourth speed driven gear 54b engages with the second speed driven gear 52*b*. When second speed driven gear 52*b* is engaged with the fourth speed driven gear 54*b*, the second speed driven gear 52*b* rotates synchronously with the output-side transmission shaft 30 integrally with the fourth speed driven gear 54*b*.

The fifth speed gear train G5 includes a fifth speed drive gear 55*a* which is rotatably supported by the input-side transmission shaft 29 via a collar at a position between the first speed drive gear 51*a* and the third speed drive gear 53*a*, and a fifth speed driven gear 55*b* which is slidable in the axial direction relative to the output-side transmission shaft 30, and is supported by the output-side transmission shaft 30 and meshes with the fifth speed drive gear 55*a* so as to rotate synchronously with the output-side transmission shaft 30, When the third speed drive gear 53*a* slides rightward relative to the input-side transmission shaft 29, the third speed drive gear 53*a* engages with the fifth speed drive gear 55*a*. When the fifth speed drive gear 55*a* is engaged with the third-speed drive gear 53*a*, the fifth speed drive gear 55*a* rotates synchronously with the input-side transmission shaft 29 integrally with the third speed drive gear 53*a*. A shift fork (not illustrated) is engaged with the fifth speed driven gear 55*b*, and the fifth speed driven gear 55*b* slides in the axial direction relative to the output-side transmission shaft 30 in accordance with the movement of the shift fork. When the fifth speed driven gear 55*b* slides rightward relative to the output-side transmission shaft 30, the fifth speed driven gear 55*b* engages with the first speed driven gear 51*b*. When the first speed driven gear 51*b* is engaged with the fifth speed driven gear 55*b*, the first speed driven gear 51*b* rotates synchronously with the output-side transmission shaft 30 integrally with the fifth speed driven gear 55*b*. When the fifth speed driven gear 55*b* slides leftward with relative to the output-side transmission shaft 30, the fifth speed driven gear 55*b* engages with the third speed driven gear 53*b*. When the third speed driven gear 53*b* is engaged with the fifth speed driven gear 55*b*, the third speed driven gear 53*b* rotates synchronously with the output-side transmission shaft 30 integrally with the fifth speed driven gear 55*b*.

A right end portion 30R of the output-side transmission shaft 30 in the axial direction is exposed rightward and outward from the right cover wall portion 26R of the right crankcase half body 17.

A left end portion 30L of the output-side transmission shaft 30 in the axial direction extends leftward and outward from the left cover wall portion 26L of the left crankcase half body 16, A cam chain drive sprocket 36 is fixed to the left end portion 30L of the output-side transmission shaft 30 extending leftward and outward from the left cover wall portion 26L of the left crankcase half body 16. The can chain drive sprocket 36 rotates integrally with the output-side transmission shaft 30.

A left end portion of the crankshaft 18 in the axial direction extends leftward and outward from the left crankcase half body 16. A generator 31 which generates electric power by rotation of the crankshaft 18 is connected to the left end portion of the crankshaft 18 extending leftward and outward from the left crankcase half body 16.

The generator 31 includes a rotor 32 and a stator 33. In the present embodiment, the generator 31 is an outer rotor type rotary electric machine in which the rotor 32 is disposed on an outer side of the stator 33 in a radial direction. Therefore, the rotor 32 is fixed to the crankshaft 18 and surrounds an outer peripheral surface of the stator 33.

The generator 31 is covered with a generator cover 34. The generator cover 34 has a substantially cylindrical shape with a bottom, and is fixed to the left crankcase half body 16 of the crankcase 12 such that the bottom portion covers a left side of the generator 31, A generator chamber 35 which is surrounded by a left side surface of the left crankcase half body 16 and the generator cover 34 and accommodates the generator 31 is formed on a left side of the crank chamber 25. The stator 33 of the generator 31 is fixed to the generator cover 34.

Both a right end portion of the crankshaft 18 in the axial direction and a right end portion of the input-side transmission shaft 29 in the axial direction extend rightward and outward from the right crankcase half body 17.

A clutch 37 is disposed on the right outside of the crankcase 12, that is, on the right outside of the right crankcase half body 17. The clutch 37 switches connection and disconnection of power transmission between the crankshaft 18 and the input-side transmission shaft 29 by release or engagement.

The clutch 37 includes a clutch outer 37*a* and a clutch hub 37*b*. A plurality of clutch plates 37*c* are alternately arranged in the axial direction of the input-side transmission shaft 29 between the clutch outer 37*a* and the clutch hub 37*b*. An appropriate amount of lubricating oil is present between the plurality of clutch plates 37*c*.

A primary reduction gear 39 and a damper (not illustrated) are provided between the crankshaft 18 and the clutch outer 37*a*.

The primary reduction gear 39 includes a primary drive gear 41 which is fixed to the right end portion of the crankshaft 18 extending toward the right outside of the right crankcase half body 17, and a primary driven gear 42 which is supported by the input-side transmission shaft 29 so as to be rotatable relative to the input-side transmission shall 29 and is engaged with the primary drive gear 41. The clutch outer 37*a* of the clutch 37 is coupled and fixed to the primary driven gear 42 via the damper (not illustrated).

Therefore, the rotational power of the crankshaft 18 is transmitted to the clutch outer 37*a* via the primary reduction gear 39 and the damper.

The clutch hub 37*b* is fixed to the right end portion of the input-side transmission shaft 29 extending toward the right outside of the right crankcase half body 17.

The clutch 37 is appropriately coupled to a manually operable clutch lever (not illustrated) provided on a handlebar of the motorcycle. In the clutch 37, release and engagement are switched between the clutch outer 37*a* and the clutch hub 37*b* in response to an operation of the clutch lever performed by an occupant of the motorcycle. When the clutch outer 37*a* and the clutch hub 37*b* are engaged with each other, a power transmission path between the crankshaft 18 and the input-side transmission shaft 29 is connected, and when the clutch outer 37*a* and the clutch hub 37*b* are released, the power transmission path between the crankshaft 18 and the input-side transmission shaft 29 is disconnected.

A crankcase cover 44 which covers a right side of the crankcase 12 is fastened to the right crankcase half body 17. An opening portion 43 is formed in the crankcase cover 44 at a position facing the clutch 37 from the right side. A clutch cover 45 which closes the opening portion 43 and covers the right side of the clutch 37 is fastened to the crankcase cover 44. In the right crankcase half body 17, a clutch chamber 38, which is surrounded by the right crankcase half body 17, the crankcase cover 44, and the clutch cover 45, and accommodates the clutch 37 and the primary reduction gear 39, is formed on the right side of the crank chamber 25 and the transmission chamber 26.

An oil reservoir (not illustrated) in which oil is stored is formed at a lowermost portion of the crankcase 12. An oil pump 61 is provided at a lower portion of the crankcase 12. The oil pump 61 sucks oil stored in the oil reservoir via an oil strainer (not illustrated) and pumps the oil to each part of the drive unit 1. The oil pump 61 is provided on a pump shaft 62 having an axis extending in the vehicle width direction parallel to the input-side transmission shaft 29, the output-side transmission shaft 30, and the crankshaft 18. A right end portion of the pump shaft 62 extends to the clutch chamber 38 which accommodates the clutch 37 and the primary reduction gear 39, and a pump gear 63 (see FIG. 4) is fixed to the right end portion of the pump shaft 62 which extends to the clutch chamber 38. The pump gear 63 is disposed between the right crankcase half body 17 and the primary driven gear 42 of the primary reduction gear 39 in the vehicle width direction, and meshes with a pump drive gear 64 (see FIG. 5) which rotates integrally with the primary driven gear 42.

Figure 4:
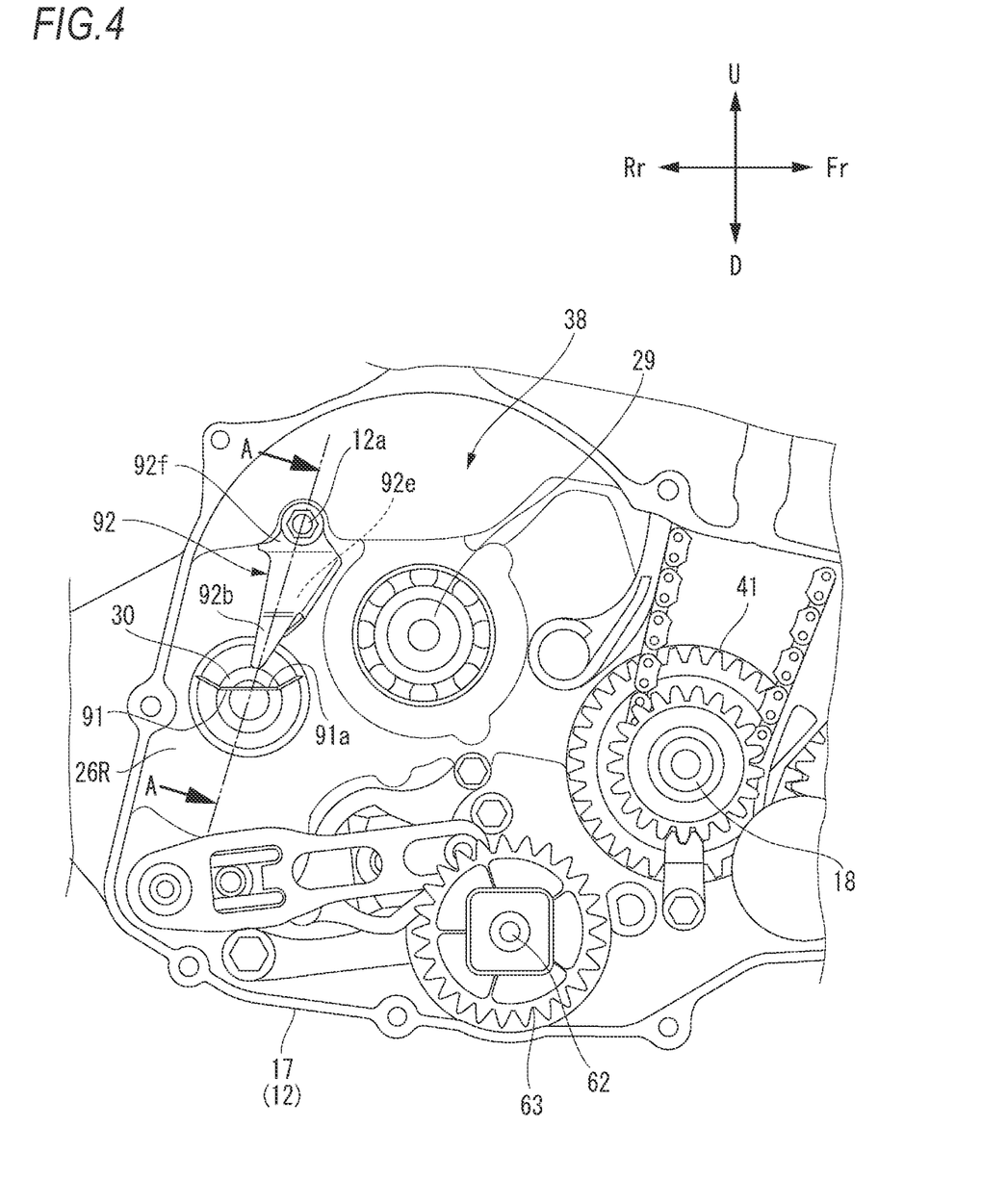
FIG. 4 is an enlarged view of a main part of a clutch chamber of the drive unit illustrated in FIGS. 1 and 2 when viewed from the right side in a state where a clutch and a primary reduction gear are removed.
Figure 5:
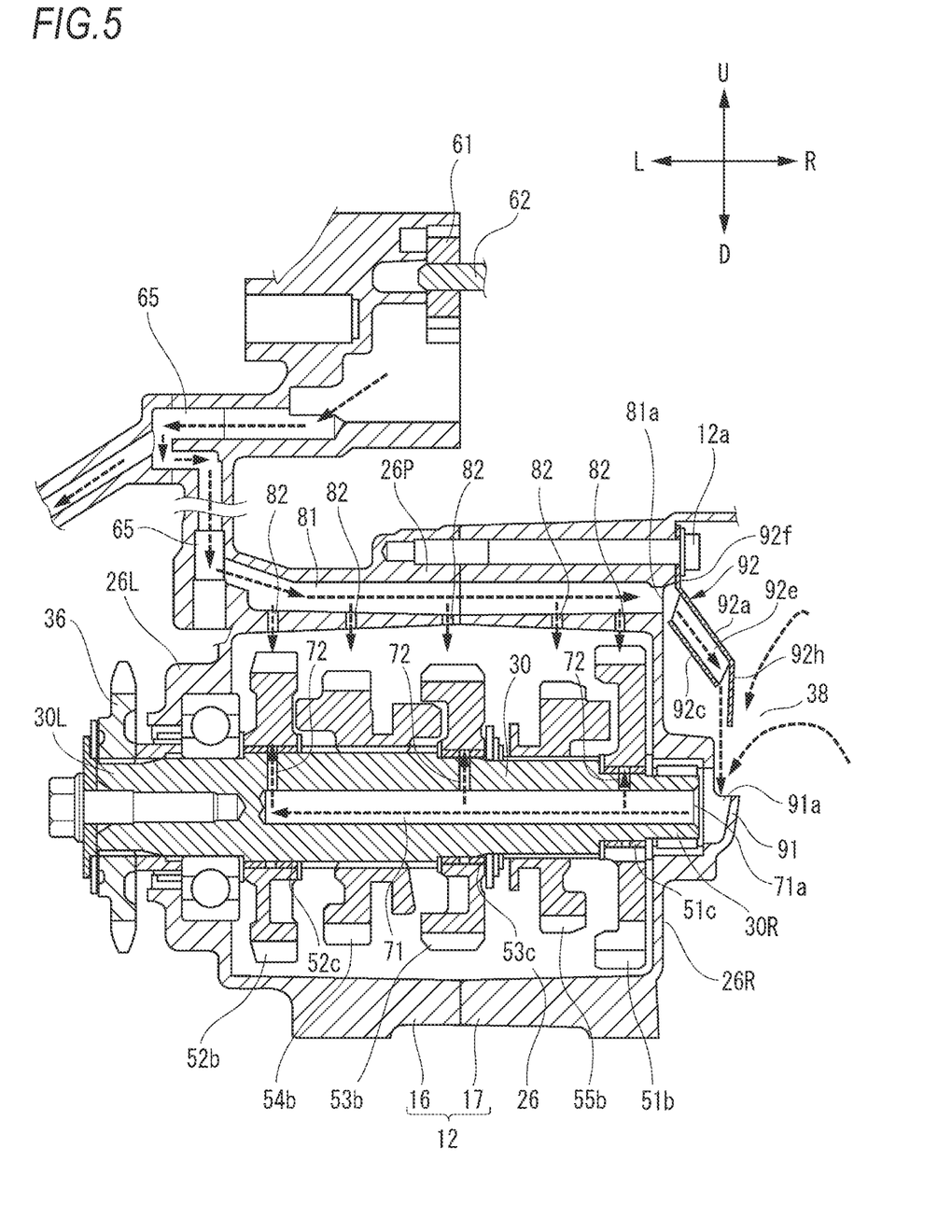
FIG. 5 is a cross-sectional view taken along a line A-A of FIG. 4.

Therefore, the rotational power of the crankshaft 18 is transmitted to the primary reduction gear 39, and is transmitted from the pump drive gear 64 which rotates integrally with the primary driven gear 42 to the pump shaft 62 provided with the oil pump 61 via the pump gear 63. Accordingly, the pump shaft 62 is rotated by the rotational power of the crankshaft 18, so that the oil pump 61 is operated.

A part of the oil stored in the lowermost portion of the clutch chamber 38 is scooped up by at least one gear disposed in the clutch chamber 38, such as the primary drive gear 41 and the primary driven gear 42 of the primary reduction gear 39, the pump gear 63, and the pump drive gear 64. Accordingly, each of the gears disposed in the clutch chamber 38 is lubricated and cooled by being exposed to the oil scooped up.

As illustrated in FIGS. 4 and 5, the crankcase 12 includes an outer peripheral wall portion 26P which covers outer peripheral surfaces of the first speed driven gear 51b, the second speed driven gear 52b, the third speed driven gear 53b, the fourth speed driven gear 54b, and the fifth speed driven gear 55b which are supported by the output-side transmission shaft 30 of the gear transmission 28.

As described above, the right crankcase half body 17 of the crankcase 12 includes the right cover wall portion 26R which pivotally supports the right end portion 30R of the output-side transmission shaft 30 and covers the right side of the gear transmission 28 to form the right side wall of the transmission chamber 26. The right end portion 30R of the output-side transmission shaft 30 is exposed rightward from the right cover wall portion 26R.

An in-shaft oil passage 71 extending in the axial direction of the output-side transmission shaft 30 is formed inside the output-side transmission shaft 30. The in-shaft oil passage 71 includes an in-shaft oil passage opening portion 71a which opens rightward from the right end portion 30R of the output-side transmission shaft 30. Therefore, the in-shaft oil passage 71 opens rightward from the right end portion 30R of the output-side transmission shaft 30.

The right cover wall portion 26R is provided with an oil collecting pocket 91 at a position where at least a part of the right cover wall portion 26R overlaps with the output-side transmission shaft 30 when viewed from the right side. The oil collecting pocket 91 protrudes rightward from the right cover wall portion 26R, and includes an oil collecting portion 91a opened upward and leftward.

As described above, a part of the oil stored in the lowermost portion of the clutch chamber 38 is scooped up by at least one gear disposed in the clutch chamber 38. The oil collecting portion 91a of the oil collecting pocket 91 can collect a part of the oil which is lifted upward by at least one gear disposed in the clutch chamber 38, and scattered in the clutch chamber 38 adjacent to the transmission chamber 26. The oil collected in the oil collecting portion 91a of the oil collecting pocket 91 is supplied to the in-shaft oil passage 71 from the in-shaft oil passage opening portion 71a.

In the output-side transmission shaft 30, oil supply holes 72 penetrating in the radial direction from the in-shaft oil passage 71 to the outer peripheral surface are formed. A total of three oil supply holes 72 are formed, in the axial direction of the output-side transmission shaft 30, at a position overlapping the first collar 51c, a position overlapping the second collar 52c, and a position overlapping the third collar 53c, respectively.

The oil supplied from the in-shaft oil passage opening portion 71a to the in-shaft oil passage 71 is discharged outward in the radial direction from the oil supply holes 72 to lubricate a space between the first collar 51c and the output-side transmission shaft 30, a space between the second collar 52c and the output-side transmission shaft 30, and a space between the third collar 53c and the output-side transmission shaft 30, thereby cooling the first collar 51c and the first speed driven gear 51b, the second collar 52c and the second speed driven gear 52b, and the third collar 53c and the third speed driven gear 53b.

In the outer peripheral wall portion 26P of the crankcase 12, an in-case oil passage 81 extending in the axial direction of the output-side transmission shaft 30 is formed above the first speed driven gear 51b, the second speed driven gear 52b, the third speed driven gear 53b, the fourth speed driven gear 54b, and the fifth speed driven gear 55b.

In the drive unit 1, an oil distribution path 65 for distributing the oil pumped from the oil pump 61 to each part of the drive unit 1 is formed, and the in-case oil passage 81 communicates with the oil distribution path 65. Therefore, the oil pumped from the oil pump 61 is supplied to the in-case oil passage 81.

Oil discharge holes 82 are formed in the outer peripheral wall portion 26P of the crankcase 12 to communicate the in-case oil passage 81 with the inside of the transmission chamber 26. A total of five oil discharge holes 82 are formed, in the axial direction of the output-side transmission shaft 30, at a position overlapping the first-speed driven gear 51b, a position overlapping the second speed driven gear 52b, a position overlapping the third speed driven gear 53b, a position overlapping the fourth speed driven gear 54b, and a position overlapping the fifth speed driven gear 55b, respectively.

The in-case oil passage 81 includes an in-case oil passage opening portion 81a which opens rightward from the right cover wall portion 26R.

The oil pumped from the oil pump 61 and supplied from the oil distribution path 65 to the in-case oil passage 81 is partially discharged from the five oil discharge holes 82, supplied to the first speed driven gear 51b, the second speed driven gear 52b, the third speed driven gear 53b, the fourth speed driven gear 54b, and the fifth speed driven gear 55b, and lubricates and cools the first speed driven gear 51b, the second speed driven gear 52b, the third speed driven gear 53b, the fourth speed driven gear 54b, and the fifth speed driven gear 55b. Then, the remaining oil which has not been discharged from the five oil discharge holes 82 is discharged from the in-case oil passage opening portion 81a.

In the right cover wall portion 26R, an oil guide member 92 is provided at a position where at least a part of the right cover wall portion 26R overlaps the in-case oil passage opening portion 81a when viewed from the right side. The oil guide member 92 guides the oil discharged from the in-case oil passage opening portion 81a to the oil collecting portion 91a of the oil collecting pocket 91.

Therefore, the oil discharged from the in-case oil passage opening portion 81a hits the oil guide member 92 and is supplied to the oil collecting portion 91a of the oil collecting pocket 91.

Accordingly, the oil collecting portion 91a of the oil collecting pocket 91 collects the oil discharged from the in-case oil passage opening portion 81a in addition to the oil scattered in the clutch chamber 38 adjacent to the right side of the transmission chamber 26, so that a larger amount of oil can be supplied to the in-shaft oil passage 71.

Figure 6:
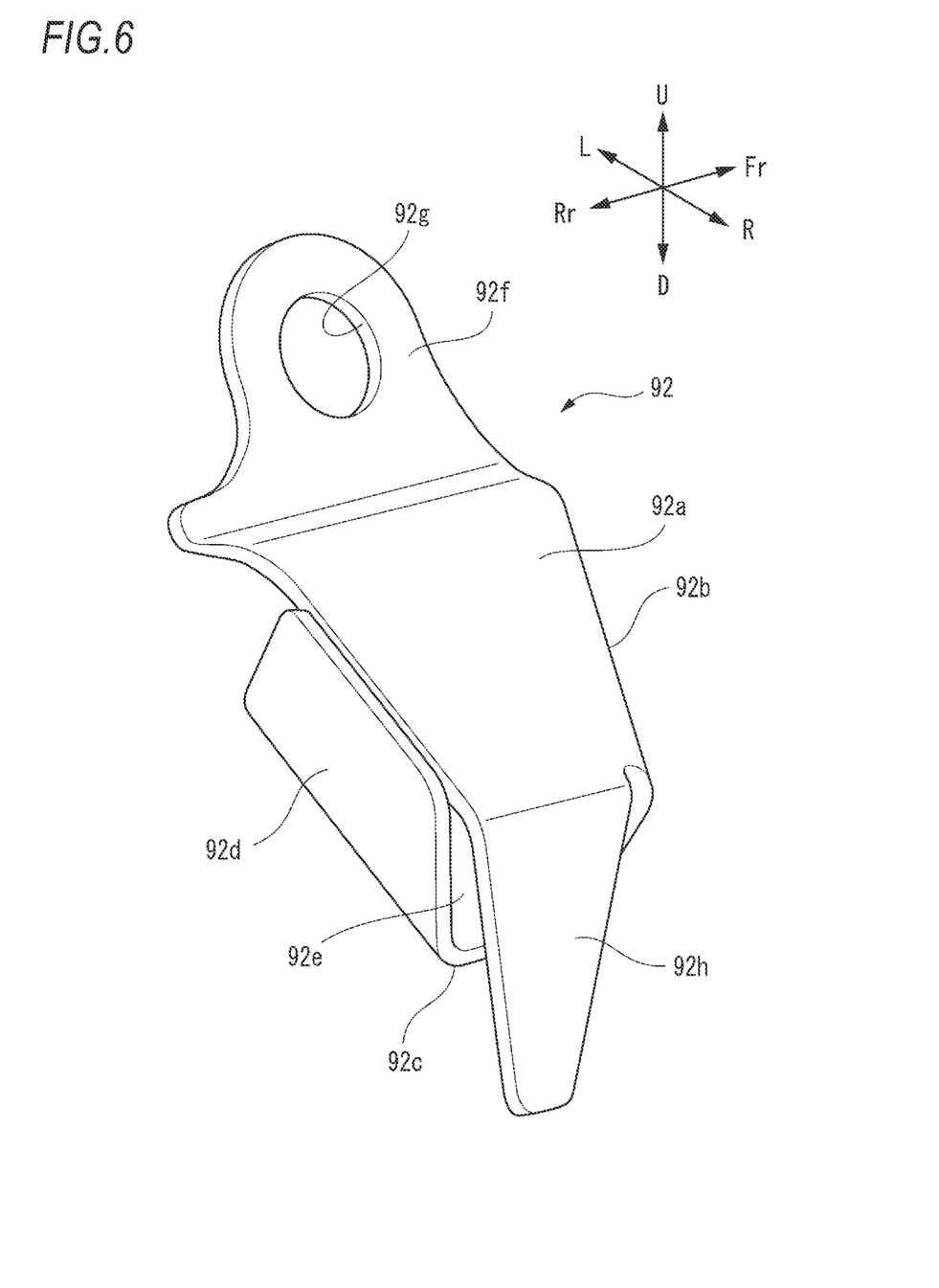
FIG. 6 is a perspective view of an oil guide member of the drive unit of FIG. 1.
Figure 7A:
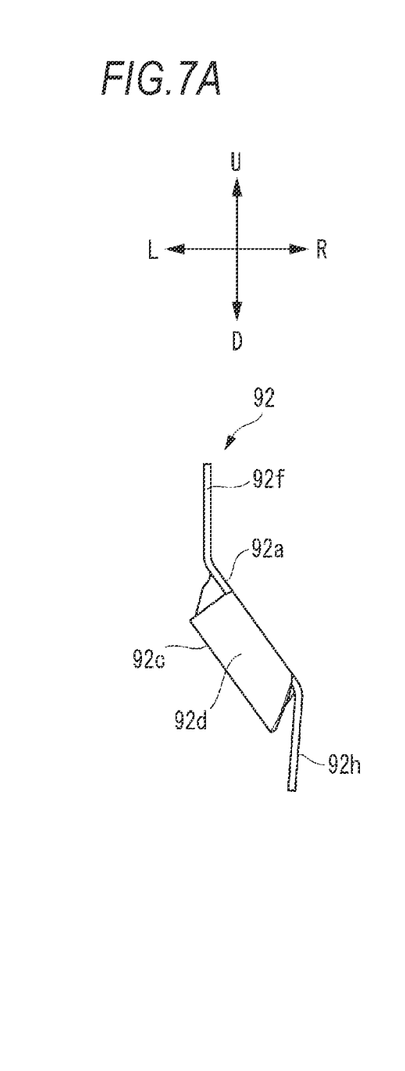
FIG. 7A is a rear view of the oil guide member of FIG. 6 as viewed from the rear.
Figure 7B:
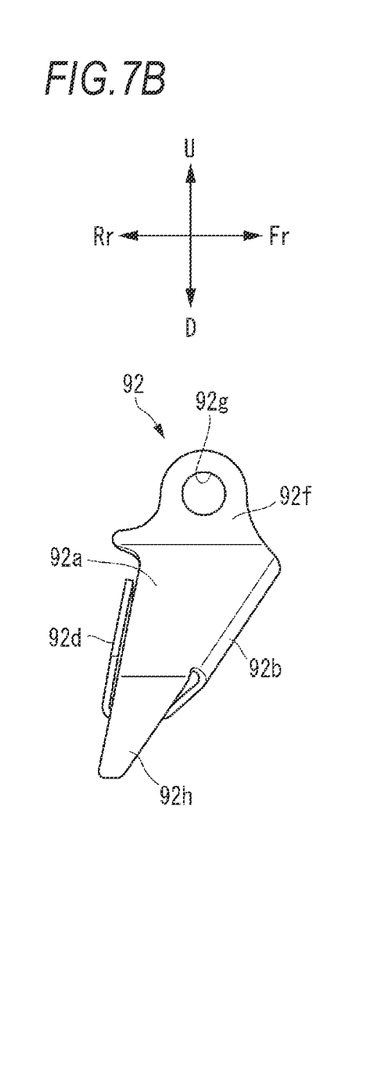
FIG. 7B is a right side view of the oil guide member in FIG. 6 as viewed from the right.
Figure 7C:
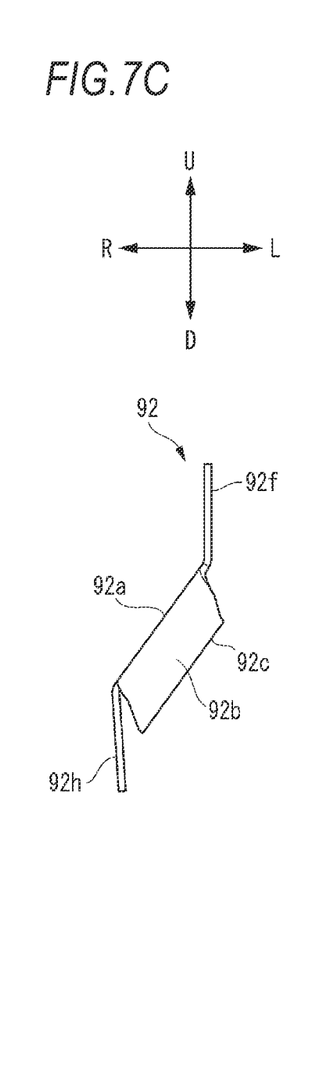
FIG. 7C is a front view of the oil guide member in FIG. 6 as viewed from the front.
Figure 7D:
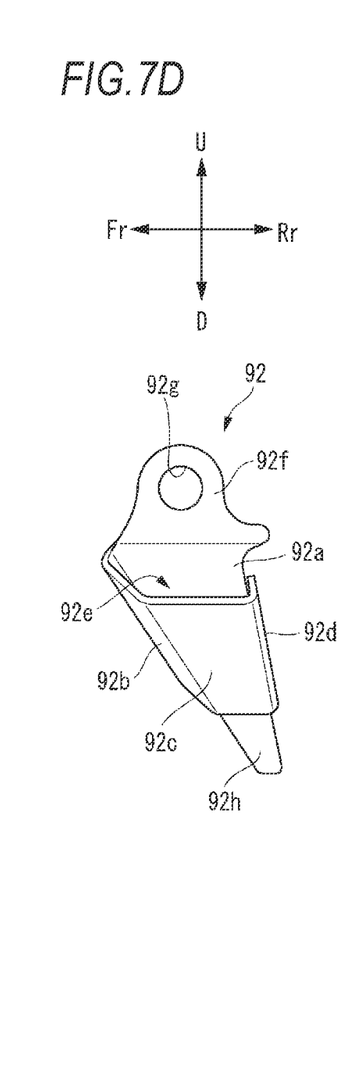
FIG. 7D is a left side view of the oil guide member in FIG. 6 as viewed from the left.

As illustrated in FIGS. 6 to 7D, the oil guide member 92 includes an upper wall portion 92a, a front wall portion 92b, a lower wall portion 92c, and a rear wall portion 92d. The oil guide member 92 is provided with a cylindrical guide oil passage 92e surrounded by the upper wall portion 92a, the front wall portion 92b, the lower wall portion 92c, and the rear wall portion 92d.

Accordingly, the oil discharged from the in-case oil passage opening portion 81a hits the oil guide member 92 and is introduced into the cylindrical guide oil passage 92e. Since the oil is supplied from the cylindrical guide oil passage 92e to the oil collecting portion 91a of the oil collecting pocket 91, the oil discharged from the in-case oil passage opening portion 81a can be more reliably guided to the oil collecting portion 91a of the oil collecting pocket 91.

In the oil guide member 92, the upper wall portion 92a, the front wall portion 92b, the lower wall portion 92c, and the rear wall portion 92d are formed by bending a single plate-shaped member. The upper wall portion 92a, the front wall portion 92b, the lower wall portion 92c, and the rear wall portion 92d are formed such that, when viewed from the right side, the guide oil passage 92e extends from the in-case oil passage opening portion 81a located above toward the oil collecting portion 91a of the oil collecting pocket 91 located below while being inclined rearward, and when viewed from the rear side, the guide oil passage 92e extends from the in-case oil passage opening portion 81a located above toward the oil collecting portion 91a of the oil collecting pocket 91 located below while being inclined rightward.

An upper end portion of the upper wall portion 92a is provided with an attachment portion 92f which bends and extends upward from the upper end portion of the upper wall portion 92a. A bolt insertion hole 92g is formed in the attachment portion 92f. A bolt 12a which fastens the left crankcase half body 16 and the right crankcase half body 17 is inserted into the bolt insertion hole 92g, and the oil guide member 92 is fastened and fixed together with the left crankcase half body 16 and the right crankcase half body 17 by the bolt 12a.

Further, a lower end portion of the upper wall portion 92a is provided with a guide wall 92h which bends and extends downward from the lower end portion of the upper wall portion 92a.

Therefore, the oil passing through the guide oil passage 92e inclined rearward and rightward from above to below hits the guide wall 92h, and is guided downward and supplied to the oil collecting portion 91a of the oil collecting pocket 91.

In this way, the oil guide member 92 is formed by bending a single plate-shaped member. Accordingly, the oil guide member 92 can be manufactured more easily and at a low cost.

As illustrated in FIG. 5, the guide oil passage 92e is formed apart from the in-case oil passage opening portion 81a. Therefore, the in-case oil passage opening portion 81a is opened in the right cover wall portion 26R.

For example, in a case where the oil guide member 92 is a pipe member coupled to the in-case oil passage opening portion 81a and the in-case oil passage opening portion 81a is not opened at the right cover wall portion 26R, a flow path of the oil pumped from the oil pump 61 and passing through the in-case oil passage 81 ranges from the in-case oil passage 81 to a downstream end of the oil guide member 92 which is a pipe member coupled to the in-case oil passage opening portion 81a, and the flow path resistance increases. When the flow path resistance increases, a flow rate of the oil pumped from the oil pump 61 decreases, and the amount of the oil discharged from the in-case oil passage opening portion 81a decreases.

In the present embodiment, the guide oil passage 92e is formed apart from the in-case oil passage opening portion 81a and the in-case oil passage opening portion 81a is opened in the right cover wall portion 26R. Therefore, the oil flowing through the in-case oil passage 81 is once discharged from the in-case oil passage opening portion 81a, and then hits the oil guide member 92 to be collected. Accordingly, it is possible to prevent a decrease in the flow rate of the oil pumped from the oil pump 61 to the in-case oil passage 81. Therefore, the oil discharged from the in-case oil passage opening portion 81a can be guided to the oil collecting portion 91a of the oil collecting pocket 91 by the oil guide member 92 without reducing the amount of the oil discharged from the in-case oil passage opening portion 81a, in this way, a larger amount of oil can be discharged from the in-case oil passage opening portion 81a, and a larger amount of oil can be guided to the oil collecting portion 91a of the oil collecting pocket 91 by the oil guide member 92, so that a larger amount of oil can be supplied to the in-shaft oil passage 71.

Further, as illustrated in FIGS. 4 and 6, the guide oil passage 92e is formed such that a cross-sectional area of the flow passage decreases as the guide oil passage 92e approaches the oil collecting portion 91a of the oil collecting pocket 91.

Accordingly, a larger amount of oil discharged from the in-case oil passage opening portion 81a can be introduced into the guide oil passage 92e, and the oil introduced into the guide oil passage 92e can be more reliably guided to the oil collecting portion 91a of the oil collecting pocket 91.

Although one embodiment of the present disclosure has been described above with reference to the accompanying drawings, it is needless to say that the present disclosure is not limited to such an embodiment. It is apparent to those skilled in the art that various changes and modifications can be conceived within the scope of the claims, and it is also understood that such variations and modifications belong to the technical scope of the present disclosure. In addition, the constituent elements in the above embodiment may be combined as desired without departing from the spirit of the present disclosure.

For example, in the present embodiment, the drive unit 1 in which the internal combustion engine 10 and the gear transmission 28 are integrated has been described as an example of the transmission unit, and a transmission unit may be provided with the gear transmission 28, and may not be a unit integrated with the internal combustion engine 10.

For example, the in-shaft oil passage 71 is formed in the output-side transmission shaft 30 and the oil collecting pocket 91 is provided on the right side of the output-side transmission shaft 30 in the present embodiment, and the in-shaft oil passage 71 may be provided in the input-side transmission shaft 29 or other transmission shafts and the oil collecting pocket 91 may be provided on one end side in the axial direction of the shaft provided with the in-shall oil passage 71.

In the present embodiment, the in-case oil passage 81 is provided in the outer peripheral wall portion 26P which covers the outer peripheral surfaces of the first speed driven gear 51b, the second speed driven gear 52b, the third speed driven gear 53b, the fourth speed driven gear 54b, and the fifth speed driven gear 55b supported by the output-side transmission shaft 30 of the gear transmission 28, and the in-case oil passage 81 may be formed in an outer peripheral wall portion which covers outer peripheral surfaces of the first speed drive gear 51a, the second speed drive gear 52a, the third speed drive gear 53a, the fourth speed drive gear 54a, and the fifth speed drive gear 55a supported by the input-side transmission shaft 29 of the gear transmission 28.

At least the following matters are described in the present description. In the parentheses, the corresponding constituent elements and the like in the above embodiment are shown as an example, and the present disclosure is not limited thereto.

(1) A transmission unit (drive unit 1) includes:
a gear transmission (gear transmission 28) including a transmission shaft (output-side transmission shaft 30) and a plurality of gears (a first speed driven gear 51b, a second speed driven gear 52b, a third speed driven gear 53b, a fourth speed driven gear 54b, and a fifth speed driven gear 55b); and
an accommodating case (crankcase 12) including a transmission chamber (transmission chamber 26) which rotatably and pivotally supports the transmission shaft and accommodates the gear transmission, in which:
the accommodating case includes:
an outer peripheral wall portion (outer peripheral wall portion 26P) which covers outer peripheral surfaces of the plurality of gears; and
a cover wall portion (right cover wall portion 26R) which pivotally supports a first end portion (right end portion 30R) on one end side (right side) of the transmission shaft in an axial direction and covers one end side of the gear transmission in the axial direction to form a side wall on one end side of the transmission chamber in the axial direction;
the first end portion of the transmission shaft is exposed from the cover wall portion to the one end side in the axial direction;
an in-shaft oil passage (in-shaft oil passage 71) extending in the axial direction of the transmission shaft is formed inside the transmission shaft;
the in-shaft oil passage includes an in-shaft oil passage opening portion (in-shaft oil passage opening portion 71a) which opens from the first end portion of the transmission shaft to the one end side in the axial direction;
the cover wall portion is provided with an oil collecting pocket (oil collecting pocket 91) at a position where at least a part of the cover wall portion overlaps the transmission shaft when viewed from the one end side in the axial direction, the oil collecting pocket (oil collecting pocket 91) protruding from the cover wall portion to the one end side in the axial direction and including an oil collecting portion (oil collecting portion 91a) opened upward and on the other side in the axial direction (left side);
the oil collecting portion of the oil collecting pocket is configured to collect oil scattering in a space (clutch chamber 38) adjacent to the transmission chamber;
the oil collected in the oil collecting portion of the oil collecting pocket is supplied to the in-shaft oil passage from the in-shaft oil passage opening portion;
an in-case oil passage (in-case oil passage 81) extending in the axial direction above the plurality of gears is formed inside the outer peripheral wall portion of the accommodating case;
the in-case oil passage includes an in-case oil passage opening portion (in-case oil passage opening portion 81a) which opens from the cover wall portion to the one end side in the axial direction: and
the cover wall portion is provided with an oil guide member (oil guide member 92) at a position where at least a part of the cover wall portion overlaps the in-case oil passage opening portion when viewed from the one end side in the axial direction, the oil guide member guiding oil discharged from the in-case oil passage opening portion to the oil collecting portion of the oil collecting pocket.

According to the item (1), the oil collecting portion of the oil collecting pocket collects the oil discharged from the in-case oil passage opening portion in addition to the oil scattered in the space adjacent to the transmission chamber, so that a larger amount of oil can be supplied to the in-shaft oil passage.

(2) The transmission unit according to (1), in which the in-case oil passage opening portion is opened in the cover wall portion.

According to (2), the in-case oil passage opening portion is opened in the cover wall portion, so that the oil discharged from the in-case oil passage opening portion can be guided to the oil collecting portion of the oil collecting pocket by the oil guide member without reducing the amount of the oil discharged from the in-case oil passage opening portion. Accordingly, a larger amount of oil can be discharged from the in-case oil passage opening portion, and a larger amount of oil can be guided to the oil collecting portion of the oil collecting pocket by the oil guide member, so that a larger amount of oil can be supplied to the in-shaft oil passage.

(3) The transmission unit according to (1) or (2), in which:
a guide oil passage (guide oil passage 92e) which is cylindrical is formed in the oil guide member; and
the guide oil passage is separated from the in-case oil passage opening portion.

According to (3), the cylindrical guide oil passage is formed in the oil guide member, so that the oil discharged from the in-case oil passage opening portion can be more reliably guided to the oil collecting portion of the oil collecting pocket. Further, the guide oil passage is separated from the in-case oil passage opening portion, so that the in-case oil passage opening portion is opened in the cover wall portion. Therefore, the oil discharged from the in-case oil passage opening portion can be guided to the oil collecting portion of the oil collecting pocket by the oil guide member without reducing the amount of the oil discharged from the in-case oil passage Opening portion. Accordingly, a larger amount of oil can be discharged from the in-case oil passage opening portion, and a larger amount of oil can be guided to the oil collecting portion of the oil collecting pocket by the oil guide member, so that a larger amount of oil can be supplied to the in-shaft oil passage.

(4) The transmission unit according to (3), in which the guide oil passage is formed such that a cross-sectional area of a flow passage decreases as the guide oil passage approaches the oil collecting portion of the oil collecting pocket.

According to (4), the guide oil passage is formed such that the cross-sectional area of the flow passage decreases as the guide oil passage approaches the oil collecting portion of the oil collecting pocket, so that a larger amount of oil discharged from the in-case oil passage opening portion can be introduced into the guide oil passage, and the oil introduced into the guide oil passage can be more reliably guided to the oil collecting portion of the oil collecting pocket.

The invention claimed is:

1. A transmission unit (1) comprising:
 a gear transmission (28) including a transmission shaft (30) and a plurality of gears (51b, 52b, 53b, 54b, 55b); and
 an accommodating case (12) including a transmission chamber (26) which rotatably and pivotally supports the transmission shaft (30) and accommodates the gear transmission (28), wherein:
 the accommodating case (12) includes:
  an outer peripheral wall portion (26P) which covers outer peripheral surfaces of the plurality of gears; and
  a cover wall portion (26R) which pivotally supports a first end portion (30R) on one end side of the transmission shaft (30) in an axial direction and covers one end side of the gear transmission (28) in the axial direction to form a side wall on one end side of the transmission chamber (26) in the axial direction;
 the first end portion (30R) of the transmission shaft (30) is exposed from the cover wall portion (26R) to the one end side in the axial direction;
 an in-shaft oil passage (71) extending in the axial direction of the transmission shaft (30) is formed inside the transmission shaft (30);
 the in-shaft oil passage (71) includes an in-shaft oil passage opening portion (71a) which opens from the first end portion (30R) of the transmission shaft (30) to the one end side in the axial direction;
 the cover wall portion (26R) is provided with an oil collecting pocket (91) at a position where at least a part of the cover wall portion (26R) overlaps the transmission shaft (30) when viewed from the one end side in the axial direction, the oil collecting pocket (91) protruding from the cover wall portion (26R) to the one end side in the axial direction and including an oil collecting portion (91a) opened upward and on the other end side in the axial direction;
 the oil collecting portion (91a) of the oil collecting pocket (91) is configured to collect oil scattered in a space adjacent to the transmission chamber (26);
 the oil collected in the oil collecting portion (91a) of the oil collecting pocket (91) is supplied to the in-shaft oil passage (71) from the in-shaft oil passage opening portion (71a);
 an in-case oil passage (81) extending in the axial direction above the plurality of gears is formed inside the outer peripheral wall portion (26P) of the accommodating case (12);
 the in-case oil passage (81) includes an in-case oil passage opening portion (81a) which opens from the cover wall portion (26R) to the one end side in the axial direction; and
 the cover wall portion (26R) is provided with an oil guide member (92) at a position where at least a part of the cover wall portion (26R) overlaps the in-case oil passage opening portion (81a) when viewed from the one end side in the axial direction, the oil guide member (92) guiding oil discharged from the in-case oil passage opening portion (81a) to the oil collecting portion (91a) of the oil collecting pocket (91).

2. The transmission unit (1) according to claim 1, wherein the in-case oil passage opening portion (81a) is opened in the cover wall portion (26R).

3. The transmission unit (1) according to claim 1, wherein:
 a guide oil passage (92e) which is cylindrical is formed in e oil guide member (92); and
 the guide oil passage (92e) is separated from the in-case oil passage opening portion (81a).

4. The transmission unit (1) according to claim 3, wherein the guide oil passage (92e) is formed such that a cross-sectional area of a flow passage decreases as the guide oil passage (92e) approaches the oil collecting portion (91a) of the oil collecting pocket (91).

* * * * *